(12) United States Patent
Nojima et al.

(10) Patent No.: US 7,805,271 B2
(45) Date of Patent: Sep. 28, 2010

(54) EVALUATION SYSTEM FOR AMOUNT OF EMISSION GASES THROUGH FUEL SUPPLY CHAIN

(75) Inventors: Masafumi Nojima, Tokai (JP); Akiyoshi Komura, Hitachi (JP); Takeyuki Itabashi, Yasugi (JP); Sunao Funakoshi, Kasumigaura (JP); Hiroshi Arita, Hitachi (JP); Yukinobu Maruyama, Kokubunji (JP); Youichi Horii, Mitaka (JP); Takao Ishikawa, Hitachi (JP)

(73) Assignee: Hitachi, Ltd., Tokyo (JP)

( * ) Notice: Subject to any disclaimer, the term of this patent is extended or adjusted under 35 U.S.C. 154(b) by 75 days.

(21) Appl. No.: 12/034,180

(22) Filed: Feb. 20, 2008

(65) Prior Publication Data

US 2008/0236247 A1 Oct. 2, 2008

(30) Foreign Application Priority Data

Mar. 29, 2007 (JP) ............................. 2007-086333

(51) Int. Cl.
*G01N 7/00* (2006.01)
(52) U.S. Cl. .................... 702/100; 702/30; 700/286; 700/288; 700/291; 700/295; 700/296; 705/400
(58) Field of Classification Search .............. 702/30, 702/100; 700/286, 288, 291, 295, 296; 705/400
See application file for complete search history.

(56) References Cited

U.S. PATENT DOCUMENTS

| 6,885,914 B2* | 4/2005 | Shimode et al. .............. 700/288 |
| 2002/0035550 A1* | 3/2002 | Sakurai et al. .............. 705/400 |
| 2007/0038388 A1 | 2/2007 | Nojima et al. | |

FOREIGN PATENT DOCUMENTS

| JP | 2001-184406 | 7/2001 |
| JP | 2002-112458 | 4/2002 |
| JP | 2007-34865 | 2/2007 |

* cited by examiner

*Primary Examiner*—Sujoy K Kundu
(74) *Attorney, Agent, or Firm*—Antonelli, Terry, Stout & Kraus, LLP.

(57) ABSTRACT

The object of the present invention provides an evaluation system for evaluating accurately emission amount of environmental influence substance of fuel in a fuel supply facility for supplying stored fuel to a consumer.

An evaluation system evaluates the emission amount of environmental influence substance of fuel in which the environmental properties (greenhouse gas emissions) accumulated in the process of drilling a first energy, transporting and storing, producing fuel, and supplying the fuel are taken into account. The evaluation system enables to present the environmental properties of the sold fuel to the fuel consumer and allows the fuel consumer to select, thereby promoting the reduction of emission amount of the greenhouse gas of the fuel supplier and the fuel consumer.

9 Claims, 10 Drawing Sheets

FIG. 3

| FUEL ID | NAME OF FUEL | QUAN-TITY | PRICE | DATE OF PURCHASE | NAME OF ENVIRONMENT INFLUENCE SUBSTANCE | EMISSION AMOUNT OF ENVIRONMENT INFLUENCE SUBSTANCE |
|---|---|---|---|---|---|---|
| 0011 | GASOLINE | 50ℓ | 5600 | 2005/02/22 | $CO_2$ | 40kg·$CO_2$ |
| 0012 | HIGH PRESSURE HYDROGEN | 500$Nm^3$ | 105600 | 2005/03/22 | $CO_2$ | 0 |
| ⋮ | ⋮ | ⋮ | ⋮ | ⋮ | ⋮ | ⋮ |

| | AMOUNT OF MATERIAL | | AMOUNT OF FUEL | | ENVIRONMENT INFLUENCE SUBSTANCE A | | ENVIRONMENT INFLUENCE SUBSTANCE B | |
|---|---|---|---|---|---|---|---|---|
| | FLOW RATE | AMOUNT OF HEAT | FLOW RATE | AMOUNT OF HEAT | AMOUNT OF EMISSION | EMISSIONS INTENSITY OF EMISSION AMOUNT | AMOUNT OF EMISSION | EMISSIONS INTENSITY OF EMISSION AMOUNT |
| 1 FUEL A | $a_1$ | $ra_1$ | $a_2$ | $Ra_2$ | ... | ... | ... | ... |
| 2 | | | | | | | | |
| 3 | | | | | | | | |
| 4 | | | | | | | | |
| 5 | | | | | | | | |
| 6 | | | | | | | | |
| 7 | | | | | | | | |
| 8 | | | | | | | | |
| 9 | | | | | | | | |
| 10 | | | | | | | | |
| : | | | | | | | | |
| TOTAL | | | | | | | | |

FIG. 10

| ID | NAME OF FUEL | QUAN-TITY | PRICE | DATE OF SALE | NAME OF ENVIRONMENT INFLUENCE SUBSTANCE | AMOUNT OF ENVIRONMENT INFLUENCE SUBSTANCE |
|---|---|---|---|---|---|---|
| 10003 | HYDROGEN | 50Nm$^3$ | 5600 | 2005/02/22 | $CO_2$ | 40kg·$CO_2$ |
| 11005 | HYDROGEN | 50Nm$^3$ | 8600 | 2005/02/23 | $CO_2$ | 0 |
| 12000 | HYDROGEN | 100Nm$^3$ | 6600 | 2005/02/23 | $CO_2$ | 20kg$CO_2$ |

FIG. 11

| CURRENT ID | MIXED ID |
|---|---|
| 12000 | 11005   10003·· |

EVALUATION SYSTEM FOR AMOUNT OF EMISSION GASES THROUGH FUEL SUPPLY CHAIN

CLAIM OF PRIORITY

The present application claims priority from Japanese application serial no. 2007-086333, filed on Mar. 29, 2007, the content of which is hereby incorporated by reference into this application.

BACKGROUND OF THE INVENTION

The present invention relates to an evaluation system for amount of emission gases through fuel supply chain in a fuel supply facility, and more particularly, to an evaluation system in which a fuel consumer can select environmental properties in relation to fuel.

Conventionally, the deterioration of the atmospheric environment caused by greenhouse gases represented by carbon dioxide ($CO_2$) has been an important social issue. Particularly, in recent years, it has been pointed out that the global temperature rise is a reflection of the greenhouse gases, and the influence has become a serious international issue. In view of the circumstances, the Kyoto Protocol for global warming prevention became effective in February 2005, and the international agreement concerning numeric goals for reducing the greenhouse gases, transactions of amount of emission gases, joint implementation, clean development mechanism, and so forth has been fully fulfilled. However, achieving the numeric goals for reducing the greenhouse gases is considered very difficult due to the economic growth, increased demand for electricity, and so forth.

Meanwhile, the consumers are not aware of the impact on the environment exerted by energy sources required for generating electric power supplied to the consumers. Therefore, the only method to reduce the environmental burden is to simply reduce the amount of electric power through energy saving, and thus, specific measures for environmental preservation could not be taken. Under the circumstances, methods have been proposed in which the consumers of the electric power are made to select the electric power with low environmental burden and in which the supply conditions of each power plant are planned in response to the demands of the consumers (Japanese Patent Laid-Open No. 2001-184406 and Japanese Patent Laid-Open No. 2002-112458).

SUMMARY OF THE INVENTION

These conventional techniques use a model reflecting the electric power that requires immediately supply adjustment. However, this model does not taken into account, for example, the case of consumers purchasing the fuel primarily stored in a fuel supply facility such as a gas station. When considering the environmental properties of energy in a strict sense in such a fuel supply facility, it is important to consider not only the environmental resistance (amount of emission greenhouse gases) in using forms of fuel, but also the environmental properties accumulated in the process of drilling, transporting and storing a primary energy, and producing and supplying fuel. For example, hydrogen energy (hydrogen fuel) as in a fuel cell system using hydrogen or a hydrogen engine vehicle is recognized as a clean energy capable of reducing the greenhouse gas emissions. However, the process of producing the hydrogen fuel, which is a secondary energy, from a primary energy is accompanied by the emission of the greenhouse gases. In the producing process of hydrogen, there is a big difference in the environmental resistance between hydrogen obtained by converting a natural energy into electricity and then electrolyzing water by use of the electricity and hydrogen obtained by refining petroleum. In order for an infrastructure of hydrogen energy or the like to be prevalent, as for the fuel (for example, hydrogen fuel) primarily stored in a fuel supply facility, a plurality of fuels produced with different materials or methods such as hydrolysis of the water and petroleum refinement are expected to be collectively stored in a tank. In such a model, it is impossible to precisely evaluate the energy environmental properties in the fuel supply facility just by considering the environmental properties in the using forms of fuel. Therefore, the environmental resistance of primarily stored fuel cannot be presented to the fuel consumers, and the fuel cannot be supplied in response to the environmental resistance demanded by the fuel consumers.

In view of the foregoing subjects, an object of the present invention is to provide, in a fuel supply facility for supplying primarily stored fuel to consumers, an evaluation system for amount of emission gases through fuel supply chain capable of evaluating emission amount of environment influence substance in which the environmental properties accumulated in the process of drilling, transporting and storing a first energy, and producing and supplying fuel are taken into account.

In order to solve the problems, The present invention for attaining the above object is characterized in that provides an evaluation system for amount of emission gases through fuel supply chain in a fuel supply facility for supplying stored fuel to a consumer, the evaluation system comprising: a first evaluation device for evaluating first amount of emission of environment influence substance about fuel supplied from a fuel production facility to said fuel supply facility; a first storage device for storing the first amount about the fuel in a production stage evaluated by the first evaluation device; a second evaluation device for evaluating second amount of emission of environment influence substance equivalent to the fuel sold to the fuel consumer; a second storage device for storing the second amount evaluated by the second evaluation device; a third evaluation device for evaluating third amount of emission of the environment influence substance about the fuel stored in the fuel supply facility based on the first amount in the first storage device and the second amount in the second storage device; and a third storage device for storing the third amount evaluated by the third evaluation device.

The present invention can provide, in a fuel supply facility for supplying the primarily stored fuel to consumers, an evaluation system for amount of emission gases through fuel supply chain capable of evaluating amount of environmental influencing substance emissions about fuel in which the environmental properties accumulated in the process of drilling, transporting and storing a first energy, and producing and supplying the fuel are taken into account. The evaluation system can quantify the greenhouse gas emissions and support energy suppliers and energy consumers to promote reducing amount of emissions of the greenhouse gases.

BRIEF DESCRIPTION OF THE DRAWINGS

FIG. 3 is an explanatory drawing showing one example of a storage format of information stored in storage device for amount of environment influence substance emission;

FIG. 7 is an explanatory drawing showing one example of a storage format of information stored in a calculation result storage device shown in FIG. 5;

FIG. 10 is an explanatory drawing showing one example of a storage format of information stored in a storage device shown in FIG. 1; and FIG. 11 is an explanatory drawing showing one example of a storage format of information stored in a storage device.

DETAILED DESCRIPTION OF THE PREFERRED EMBODIMENTS

The preferred embodiments of the present invention will now be described in detail with reference to the drawings.

First Embodiment

Figure 1:
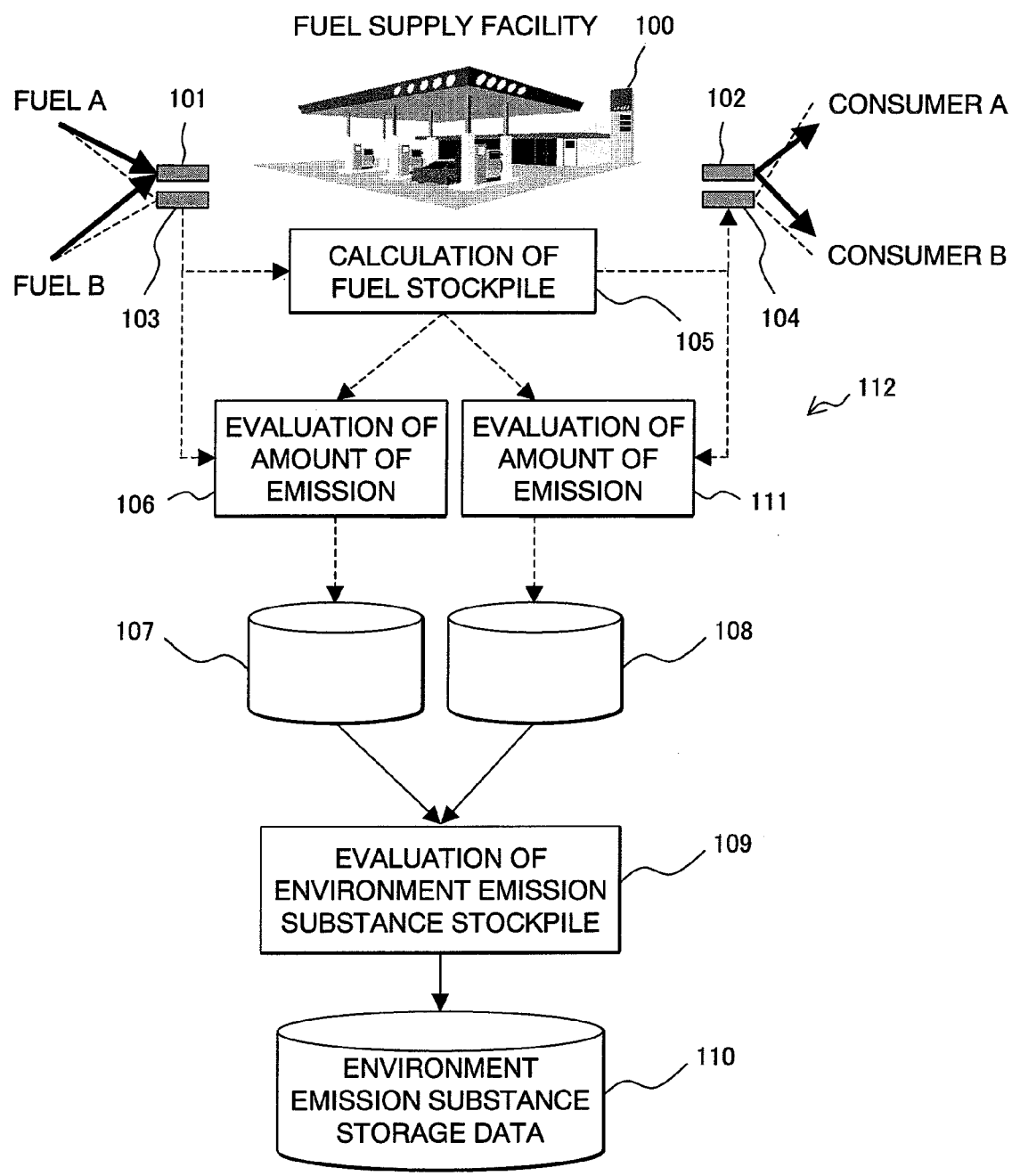
FIG. 1 is an explanatory drawing showing a system structure and a functional structure about an evaluation system for amount of emission gases through fuel supply chain in a fuel supply facility.

In the present embodiment, a fundamental structure of an evaluation system for amount of emission gases through fuel supply chain in a fuel supply facility will be described. FIG. 1 shows a system structure and a functional structure about the evaluation system (hereafter, referred to as "evaluation system") 112 for amount of emission gases through fuel supply chain in a fuel supply facility according to the present embodiment of the present invention. The fuel supply facility herein is a facility for primarily storing the fuel supplied from a fuel production facility within the facility and then supplying the fuel to fuel consumers. As shown in FIG. 1, the evaluation system 112 in a fuel supply facility 100 has a feed rate measurement apparatus 101 for measuring the amount of fuel supplied from the fuel production facility into the fuel supply facility 100, a produced fuel information storage device 103 for inputting information related to fuel production and fuel carriers and information related to an environment influence substance (for example, $CO_2$) emitted during fuel production and fuel transportation or for receiving a data file thereof, a feed rate measurement apparatus 102 for measuring the feed rate of the fuel when supplying the fuel to a consumer or to a fuel utilization device possessed by the consumer, a transmit/receive apparatus 104 for transmitting and receiving data related to the amount of the environment influence substance demanded by the consumer and data for identifying the consumer, a fuel stockpile calculation device 105 for converting signals transmitted from the feed rate measurement apparatus 101 and the feed rate measurement apparatus 102 into data and for evaluating the amount of fuel existing in the fuel supply facility 100 based on the data, an emission amount evaluation device (a first evaluation device) 106 for performing environmental property evaluation of the fuel acquired from the fuel production, an emission amount evaluation device (a second evaluation device) 111 for performing environmental property evaluation of the fuel acquired from the fuel production facility and the fuel to be sold to the consumer, a storage device (a first storage device) 107 related to produced fuel for storing information about the produced fuel acquired from the fuel production facility, a storage device (a second storage device) 108 related to sold fuel for storing the information about the fuel to be supplied to the consumer, environment emission substance stockpile evaluation device (a third evaluation device) 109 for evaluating the amount of the emission of the environment influence substance currently possessed by the fuel supply facility 100 based on information stored in the storage device 107 and the storage device 108, and a storage device (a third storage device) 110 of the fuel supply facility 100 for storing the evaluated amount of the environment influence emission substance. The fuel in this case includes, for example, gasoline, light oil, kerosene, electricity, natural gas (town gas), propane gas, hydrogen, and organic hydride. The environment influencing substance includes, for example, carbon dioxide ($CO_2$), methane, nitrous oxide ($N_2O$), tropospheric ozone ($O_3$), chlorofluorocarbon (Freon: CFC), and water vapor.

Although an example of the feed rate measurement apparatuses 101 and 102 for measuring the amount of fuel includes a flowmeter for measuring the amount of substance flowing through the pipeline, the present embodiment is not limited to this. For example, a device for measuring the amount of movement of the substance caused by the change in weight of the tank can also used as the feed rate measurement apparatuses 101 and 102.

In the present embodiment, an input device which enters received information concerning fuel into the produced fuel information storage device 103 uses a reader which receives and transmits the information stored in an RFID. The input device can also use, for example, a keyboard, a pen input device, an input recognition system, and a voice recognition device.

The fuel is produced from drilled oil in fuel production facilities and transports from fuel production facilities to the fuel supply facility (for example, gas station) 100 by fuel transportation apparatus. A process of when transferring the fuel from a fuel production facility to a fuel supply facility 100 through fuel transportation apparatus will be described with reference to a flow chart in FIG. 2.

For a specific description, it is assumed that the fuel to be supplied is high pressure hydrogen, and the fuel transportation apparatus is a high pressure hydrogen tank truck.

When transferring the fuel from the tank truck to the fuel storage tank of the fuel supply facility 100, a fuel supply hose of the tank truck is inserted into the fuel supply port of the fuel storage tank (step 1). A flowmeter is installed as the feed rate measurement apparatus 101 on the fuel supply hose or the fuel supply port. As soon as the supply of the fuel was started, the flowmeter measures the amount of fuel to be supplying into the fuel storage tank (step 2). Meanwhile, an IC tag with memory is attached on the fuel supply hose of the tank truck. In the memory, at least a fuel ID, name of fuel producer, amount of $CO_2$ emitted during the production of unit fuel amount, and amount of carbon contained per unit fuel amount are stored. Attributes in relation to the fuel such as a unit price of fuel is also stored in the memory. A similar IC tag is also attached on the fuel storage tank as a produced fuel information storage device 103 for receiving and transmitting information concerning the fuel. The IC tag of the fuel supply hose and the IC tag of the fuel storage tank have communication functions and are capable of intercommunicating. Examples of this communication device include wired, wireless LANs, a Bluetooth, or mechanical contact between the IC tags. The trigger for starting the communication is preferably the connection of the filling port of the fuel supply hose with the insertion port of the fuel storage tank. However, the trigger is not limited to these.

The information concerning the fuel stored in the IC tag attached on the fuel supply hose is transmitted into the IC tag attached on the fuel storage tank as a produced fuel information storage device 103. The information concerning the fuel, further, is transmitted from the IC tag attached on the fuel storage tank into the emission amount evaluation device 106 and stored in the storage device 107 (step 5).

The amount of hydrogen supplied from the tank truck into the fuel storage tank is measured by the feed rate measurement apparatus 101. As soon as the supplying of the fuel is finished, the fuel stockpile supplied in the fuel storage tank, that is, the amount of the purchased fuel is calculated by the fuel stockpile calculation device 105 based on this data which was measured by the feed rate measurement apparatus 101 (step 3). Information of the calculated fuel stockpile is stored in the storage device 107 (step 4). The emission amount evaluation device 106 evaluates a first total emission amount of the environment influence substance being emitted from the fuel (produced fuel) purchased from the fuel production facility based on the fuel stockpile calculated by the fuel stockpile calculation device 105, the amount of the $CO_2$ emitted during production of the unit fuel amount, and the amount of the carbon contained per unit fuel amount stored in the storage device 107 (step 6). To be more specific, the emission amount evaluation device 106 evaluates a first emission amount of the environment influence substance emitted during the production of the fuel purchased by the fuel production facility 100 based on the calculated fuel stockpile and the amount of the $CO_2$, and a second emission amount of the environment influence substance being emitted by the use of the fuel supplied into the fuel storage tank of the fuel supply facility 100 in future based on the calculated fuel stockpile and the amount of the carbon, respectively. The fuel is supplied into the storage tank by driving a pump installed on the tank truck. The emission amount evaluation device 106 also evaluates a third emission amount of the environment influence substance emitted by driving the pump and further, calculated the first total emission amount of the environment influence substance emitted and being emitted by the fuel supplied into the fuel storage tank of the fuel supply facility 100 based on the first, second and third emission amount evaluated by the emission amount evaluation device 106. The emission amount (the first total emission amount) of the environment influence substance about the purchased fuel evaluated by the emission amount evaluation device 106 is stored in the storage device 107. This emission amount of the environment influence substance is shown by data 0301 in FIG. 3. The storage format of information stored in the storage device 107 is preferably a tabular format such as the one shown in FIG. 3.

The environment emission substance stockpile evaluation device 109 reevaluates the environment emission substance stockpile of the fuel supply facility 100, to which new fuel has been added, based on data 0301 of emission amount of the environment influence substance about the fuel newly added from the storage device 107, and data of emission amount of the environment influence substance about the fuel, which has been in the fuel supply facility 100, from the storage device 110 (step 7). The environment emission substance stockpile evaluation device 109 then stores the evaluated environment emission substance stockpile in the storage device 110. As for the method of registering to the storage device 110, the history can be managed by adding a purchased fuel ID, purchased date of the fuel, and the like, in addition to the data of the emission amount of the environment influence substance about the targeted fuel.

An example of evaluating emission amount of the environment influence substance in the case of selling the fuel to a consumer using the fundamental structure of the evaluation system for amount of emission gases through fuel supply chain shown in FIG. 1 will now be described.

An example of the feed rate measurement apparatus 102 for measuring the amount of fuel supplied to a consumer is a flowmeter that measures the amount of substance flowing through the pipe. The present embodiment uses the flowmeter as the feed rate measurement apparatus 102. However, the feed rate measurement apparatus 102 is not limited to this and can also use, for example, a device for measuring the amount of movement of the substance caused by the change in weight of the tank. An example of fuel supply apparatus for supplying fuel to a consumer includes, for example, a dispenser installed in the fuel supply facility. The feed rate measurement apparatus 102 is arranged between the fuel storage tank and the supply port of the dispenser.

An example of a method for the consumer to select environmental properties of desired fuel includes a method of storing information related to the environmental properties of the fuel desired by the consumer in a memory with a communication function mounted on a car. In the present embodiment, an example will be shown in which an RFID with memory is attached to a consumer or a fuel utilization device possessed by the consumer and the consumer purchases the fuel with desired environmental properties.

First, a process in this structure will be described with reference to the flow chart of FIG. 4.

For a specific description, it is assumed that the fuel to be supplied is high pressure hydrogen, and the fuel utilization device is a hydrogen car.

When transferring the fuel from the dispenser to the fuel tank of the hydrogen car, the fuel supply hose connected with the fuel supply port of the dispenser is inserted into a fuel supply port of the fuel tank (step 11). Hydrogen as the fuel is supplied from the dispenser into the fuel tank of the hydrogen car. As soon as the supply of the fuel was started, the feed rate measurement apparatus 102 measures the amount of the fuel supplied into the fuel tank (step 12). Meanwhile, an IC tag with memory (for example, RFID) is installed on the hydrogen car. In this memory, at least a name of the requested fuel, the amount of the $CO_2$ emitted during production of the unit fuel, and the amount of the carbon contained per unit fuel amount are stored. The transmit/receive apparatus 104 for transmitting and receiving information stored in the RFID mounted on the hydrogen car is attached on the dispenser. The attachment location of the RFID is preferably near the supply port of the fuel tank of the hydrogen car. The transmit/receive apparatus 104 for transmitting and receiving the information of the dispenser is preferably installed at the tip portion of the fuel supply nozzle connected with the fuel supply hose. Data transmitted upon the starting of communication of the RFID is stored in the storage device 108 (step 15). The storage format of the information is preferably in a tabular format. The fuel stockpile calculation device 105 calculates the amount of fuel supplied into the fuel tank, that is, the amount of hydrogen (fuel) sold to the consumer based on data which was measured by the feed rate measurement apparatus 102 (step 13). The sold fuel is the fuel which is selected by the consumer. As soon as the fuel supply is finished, the data of the amount of the sold fuel calculated by the fuel stockpile calculation device 105 is stored in the storage device 108 (step 14). After the supply of the fuel into the fuel tank was finished, the emission amount evaluation device 111 evaluates a forth emission amount of the environment influence substance emitted during the production of the sold fuel in the fuel production facility based on the sold amount of the fuel selected by the consumer and the amount of the $CO_2$ from the storage device 108 (step 16). In the step 16, the emission amount evaluation device 111 evaluates a fifth emission amount of the environment influence substance being emitted by the consumption of the fuel when the hydrogen car is operated, based on the sold amount of the fuel and the amount of the carbon from the storage device 108. Further, the emission amount evaluation device 111 evaluates a sixth emission amount of the environment influence substance emitted by driving a pump which is driven in order to supply the fuel from the dispenser into the fuel tank of hydrogen car. After that, the emission amount evaluation device 111 evaluates a second total emission amount of the environment influence substance emitted and being emitted by the fuel sold to the consumer based on the forth, fifth and sixth emission amount evaluated by the emission amount evaluation device 111. The emission amount (the second total emission amount) of the environment influence substance about the sold fuel evaluated by the emission amount evaluation device 111 is stored in the storage device 108.

As soon as the sell of the fuel to the consumer is finished, the environment emission substance stockpile evaluation device 109 reevaluates the environment emission substance stockpile about the fuel which remains in the fuel storage tank of the fuel supply facility after the fuel was sold to the consumer, based on data, in which the data 0301 is also included, of emission amount of the environment influence substance about the fuel, which has been in the fuel supply facility 100, from the storage device 110 (step 17). The reevaluated the environment emission substance stockpile is stored in the storage device 110. As for the method of registering to the storage device 110, the history can be managed by adding the purchased fuel ID, purchased date of the fuel, and the like, in addition to the data of the emission amount of the environment influence substance about the targeted fuel. The emission amount of the environment influence substance related to fuel is preferably presented to the fuel consumer by display apparatus for displaying information stored in the storage devices 108 and 110. The information displayed includes, for example, name of fuel, name of environment influence substance emitted before supplying the fuel, and the emission amount of the environment influence substance equivalent to the amount of supplied fuel. Known display apparatus such as a display and a printer can be used as the display apparatus.

In the present embodiment, the management of the environment emission substance stockpile of the fuel supply facility is conducted by managing the environment emission substance stockpile in each fuel storage tank, when storing a plurality of types of fuels or fuels with different materials and production methods in a plurality of fuel storage tanks. The environment emission substance stockpile of the entire fuel stockpile in the fuel supply facility can be evaluated from the environment emission substance stockpile of each fuel storage tank, on an as needed basis. The evaluation of the environment emission substance stockpile of each fuel storage tank can be conducted in the same manner as described above by adding data of each fuel storage tank to the data of the environment emission substance stockpile stored in the storage device 110.

Other than the present embodiment, a method may be implemented in which a consumer having consumer information requests in advance to the fuel supply facility. However, other methods may be implemented.

According to the present embodiment, the fuel with environmental properties as desired by the consumer can be supplied in the fuel supply facility.

Second Embodiment

Figure 5:
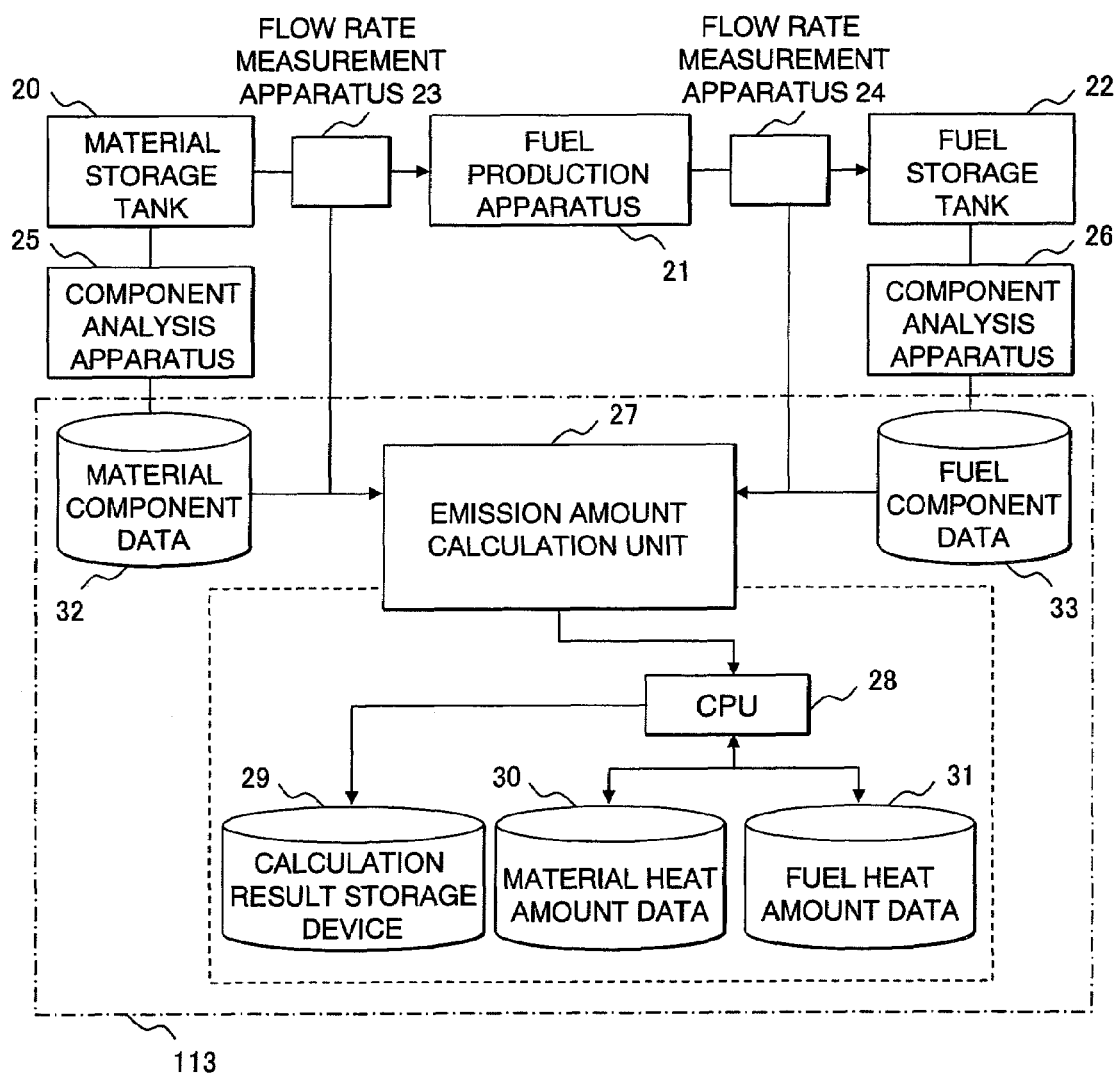
FIG. 5 is a structural diagram showing an emission amount calculation apparatus placed in a fuel production facility, used in an evaluation system for amount of emission gases through fuel supply chain according to another embodiment of the present invention.
Figure 8:
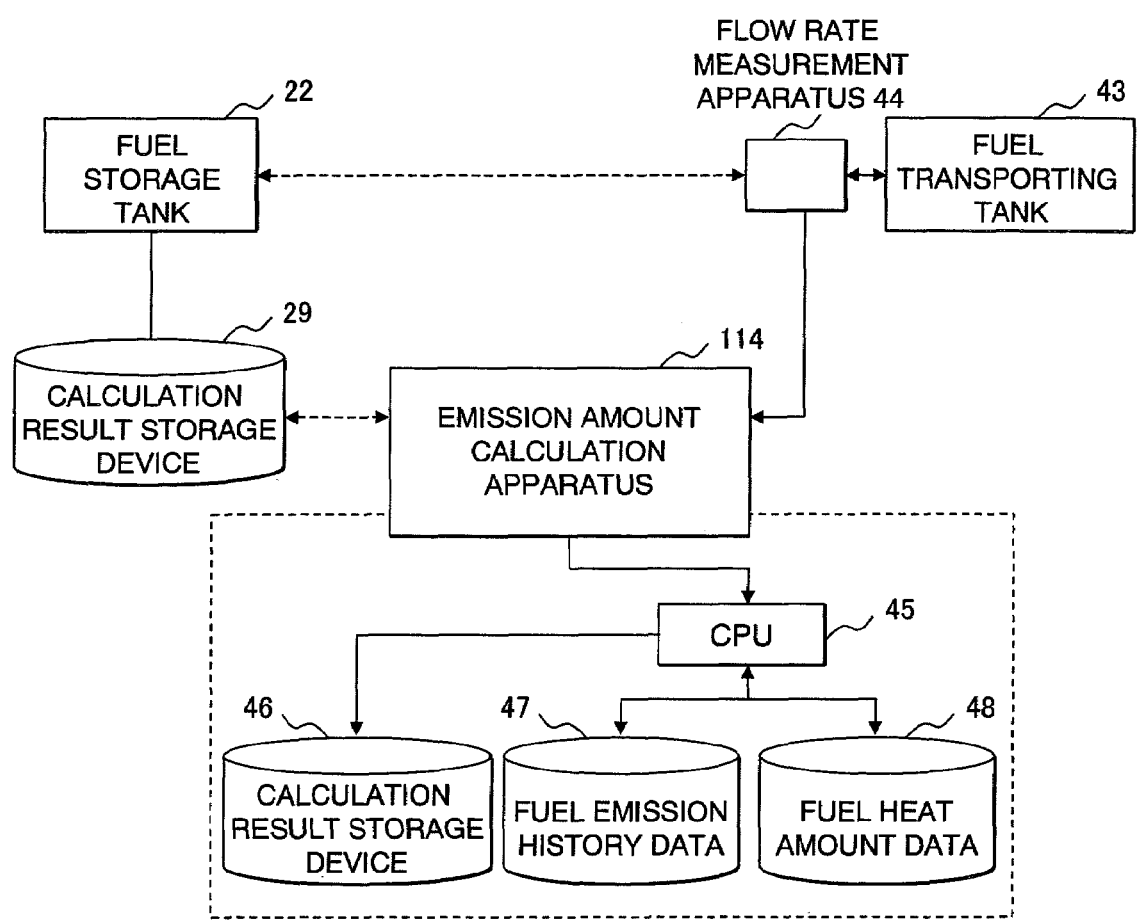
FIG. 8 is a structural diagram showing another emission amount calculation apparatus installed in a tank truck, used in an evaluation system for amount of emission gases through fuel supply chain according to another embodiment of the present invention.

An evaluation system for amount of emission gases through fuel supply chain according to a second embodiment which is another embodiment of the present invention will be described below. The evaluation system according to the present embodiment has structure in which emission amount calculation apparatuses 113 and 114 are added to the evaluation system 112 according to the first embodiment. The emission amount calculation apparatus 113 shown in FIG. 5 is disposed in a fuel production facility. The emission amount calculation apparatus 114 shown in FIG. 8 is installed, for example, in the tank truck.

A material storage tank 20 for storing materials (for example, oil), a fuel production apparatus 21 for receiving the materials from the material storage tank 20 through a first pipe and the like, for processing the materials, and for producing arbitrary fuel, a fuel storage tank 22 for storing the produced fuel through a second pipe and the like are placed in the fuel production facility. A flow rate measurement apparatus 23 is installed on the first pipe, and a flow rate measurement apparatus 24 is installed on the second pipe. The flow rate measurement apparatus 23 and 24 can communicate with the outside in a wired or wireless manner, for measuring the amount of materials supplied to the fuel production apparatus 21 and the amount of fuel supplied from the fuel production apparatus 21 to the fuel storage tank 22. A component analysis apparatus 25 is connected with the material storage tank 20. A component analysis apparatus 26 is connected with the fuel storage tank 22.

A basic structure of the emission amount calculation apparatus 113 for evaluated emission amount of the environment influence substance during fuel production will be described in the present embodiment.

As shown in FIG. 5 for example, the emission amount calculation apparatus 113 comprises a emission amount calculation unit 27 for receiving the amount of materials measured by the flow rate measurement apparatus 23 and the amount of fuel measured by the flow rate measurement apparatus 24 and calculating the emission amount of the environment influence substance, a storage device 32 having a material component database including an emissions intensity of the emission amount of an environment influence substance, and a storage device 33 having a fuel component database.

The emission amount calculation unit 27 has a central processing unit (CPU) 28, a calculation result storage device 29, a storage device 30 for storing data of heat amount of the material and a storage device 31 for storing data of heat amount of fuel. The CPU 28 is connected with the calculation result storage device 29, and the storage device 30 and 31.

Figure 6:
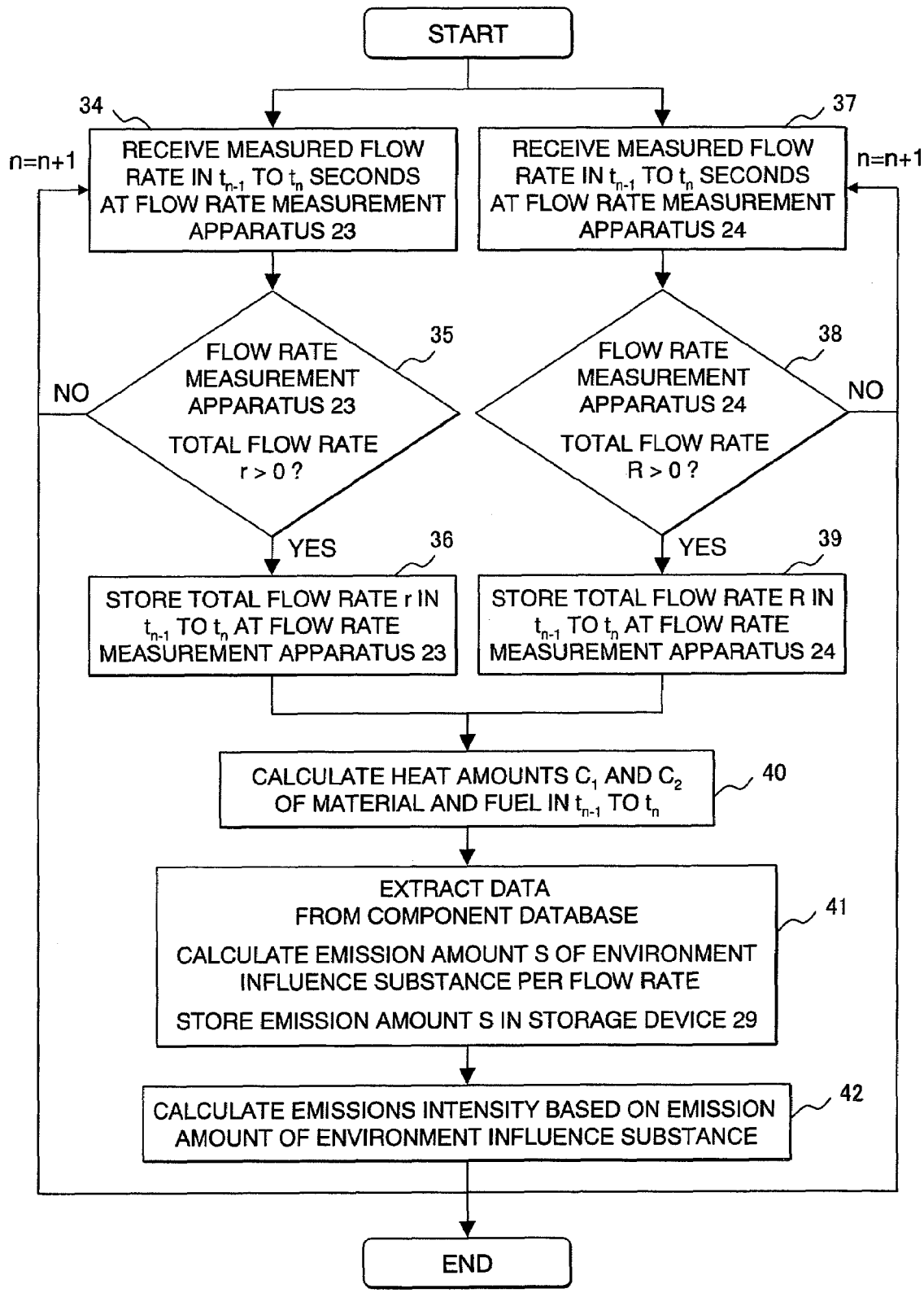
FIG. 6 is a flow chart showing a process being conducted in emission amount calculation unit shown in FIG. 5.

FIG. 6 illustrates a flow chart for calculating the emission amount of the environment influence substance in the process of producing the fuel using the emission amount calculation apparatus 113. The amount of materials transmitted from the material storage tank 20 to the fuel production apparatus 21 and the amount of fuel transmitted from the fuel production apparatus 21 to the fuel storage tank 22 are measured by the flow rate measurement apparatus 23 and 24. The measured time-by-time flow rates are transmitted to the emission amount calculation unit 27.

With reference now to FIG. 6, the process being conducted in the CPU 28 of the emission amount calculation unit 27 will be described below.

The flow rate of the material measured in $t_{n-1}$ to $t_n$ seconds by the flow rate measurement apparatus 23 is input into the CPU 28 of the emission amount calculation unit 27 (step 34). In the step 34, a total flow rate r of the material in $t_{n-1}$ to $t_n$ seconds is calculated based on the flow rate of the material measured in $t_{n-1}$ to $t_n$ seconds. Whether the total flow rate r of the material is more than 0 is determined (step 35). When the determination is NO, in the step 34, the flow rate of the material measured in $t_n$ to $t_{n+1}$ seconds by the flow rate measurement apparatus 23 is input into the CPU 28. When the determination is YES, a process of the step 36 is performed. In the step 36, the total flow rate r of the material is stored in the calculation result storage device 29.

The flow rate of the fuel measured in $t_{n-1}$ to $t_n$ seconds by the flow rate measurement apparatus 24 is input into the CPU 28 of the emission amount calculation unit 27 (step 38). In the step 38, a total flow rate R of the fuel in $t_{n-1}$ to $t_n$ seconds is calculated based on the flow rate of the fuel measured in $t_{n-1}$ to $t_n$ seconds. Whether the total flow rate R is more than 0 is determined (step 38). When the determination is NO, in the step 38, the flow rate of the fuel measured in $t_n$ to $t_{n+1}$ seconds by the flow rate measurement apparatus 23 is input into the CPU 28. When the determination is YES, a process of the step 36 is performed. In the step 36, the total flow rate R of the fuel is stored in the calculation result storage device 29.

An amount $c_1$ of heat of the material and an amount $c_2$ of heat of the fuel in $t_n$ to $t_{n+1}$ seconds are calculated (step 40). The storage device 30 stores, for example, $a_1 MJ/m^3$ that is an amount of heat per unit amount of the material. The storage device 31 stores, for example, $a_2 MJ/m^3$ that is an amount of heat per unit amount of the fuel. When from starting to finishing of fuel supply is t second and the fuel recovery time is t' second, the emission amount calculation unit 27, that is, the CPU 28 calculates the heat amount $c_1$ of the material and the heat amount $c_2$ of the fuel using Equation 1 (step 40).

[Equation 1]

$$\text{Heat amount of materials } \int (r \times a_1) dt (MJ) \text{ heat amount of fuel } \int (R \times a_2) dt (MJ) \quad (1)$$

Subsequently, amount $b_1$ of environment influence substance per unit amount heat amount of the material is extracted from the storage device (the material component database) 32. Amount $b_2$ of environment influence substance per unit amount heat amount of the fuel is extracted from the storage device (the fuel component database) 33, and the amount S of environment influence substance in the fuel production apparatus 21 is calculated with Equation 2 (step 41). The amount S of environment influence substance calculated is stored in the calculation result storage device 29.

[Equation 2]

$$S = \int^t r \times a_1 \times b_1 dt - \int^t R \times a_2 \times b_2 dt \text{ (kg)} \quad (2)$$

Emissions intensity $S_{norm}$ of emission amount of the environment influence substance is calculated by substituting the amount S of environment influence substance calculated with the Equation 2 into Equation 3 (step 42). The emissions intensity $S_{norm}$ calculated is stored in the calculation result storage device 29.

[Equation 3]

$$S_{norm} = \frac{\int^t r \times a_1 \times b_1 dt - \int^t R \times a_2 \times b_2 dt}{R \times a_2} \text{ (kg)} \quad (3)$$

At this point, if amount $x_0$ the entire well site material is transferred to the fuel production apparatus 21, emission amount $S_{all}$ of the environment influence substance in the entire supply chain is calculated with Equation 4.

[Equation 4]

$$S_{all} = x_0 \times a_0 \times b_0 - \int^t R \times a_2 \times b_2 dt_2 \quad (4)$$

Reference character $a_0$ denotes an amount of heat per unit amount $(MJ/m^3)$ of well site material, and reference character $b_0$ denotes an amount of environment influence substance per unit amount heat amount of the well site material. Emissions intensity $S_{all/norm}$ of the emission amount of the environment influence substance is calculated with Equation 5.

[Equation 5]

$$S_{all/norm} = \frac{x_0 \times a_0 \times b_0 - \int^t R \times a_2 \times b_2 dt_2}{R \times a_2} \quad (5)$$

The well site material is a material serving as a primary energy of the material used in the fuel production process. For example, in the energy distribution channel in which a natural gas is converted into hydrogen and compressed into high pressure hydrogen, when the fuel production apparatus 21 is in the compression process, the material is hydrogen, the fuel is compressed hydrogen, and the well site fuel is a natural gas.

In this case, providing a clock function to the emission amount calculation unit 27 enables to set up the date of production of the fuel. These calculation results calculated by the CPU 28 are stored, for example, in the calculation result storage device 29 in a tabular format, as shown in FIG. 7. Attributes of fuel such as name of environment influence substance and production date can also be inserted.

Usually, the material component database in the storage device 32 is included rough emission amount of the environment influence substance of the material and the fuel component database in the storage device 33 is included rough emission amount of the environment influence substance of the fuel. Chromatography is used as the component analysis apparatuses 25 and 26. The emission amount of the environment influence substance of the material stored in the storage device 32 is always updated based on the emission amount of the environment influence substance of the material obtained by the component analysis apparatus 25. The emission amount of the environment influence substance of the fuel stored in the storage device 33 is also always updated based on the emission amount of the environment influence substance of the fuel obtained by the component analysis apparatus 26. Therefore, the component analysis apparatuses 25 and 26 always stores accurate emission amount of the environment influence substance, respectively. The emission amount calculation unit 27 can always conduct calculation by reflecting accurate emission amount of the environment influence substance of the material and fuel.

After the process of the step 42, the processes of the steps 34 to 42 are repeated by using measured flow rate in $t_n$ to $t_{n+1}$ seconds. Such as the processes of the steps 34 to 42 are repeated during the fuel production.

With reference now to FIG. 8, the emission amount calculation apparatus 114 will be described below.

The emission amount calculation apparatus 114 has a central processing unit (CPU) 45, a calculation result storage device 46, a storage device 47 for storing data of emission history of the fuel and a storage device 48 for storing data of heat amount of fuel. The CPU 28 is connected with the calculation result storage device 29, and the storage device 30 and 31. The emission amount calculation apparatus 114, that is, the CPU 45 calculates emission amount of the environment influence substance.

The tank truck as the fuel transportation apparatus is installed a fuel transporting tank 43 for temporarily storing the fuel and the emission amount calculation apparatus 114. A flow rate measurement apparatus 44 measures the amount of fuel when transferring the fuel from the fuel storage tank 22 in the fuel production facility into the fuel transporting tank 43, can communicate the measurement result with the outside in a wired or wireless manner. The flow rate measurement apparatus 44 is mounted on a fuel supply hose connected with the fuel storage tank 22 placed in the fuel production facility.

The emission amount calculation apparatus 114 has a input device (not shown) for receiving the measured amount of fuel from the flow rate measurement apparatus and the data of calculation result (for example, the calculation result obtained by the processes of the steps 34 and 40 to 42) from the calculation storage device 29 of the emission amount calculation unit 27. The calculation result storage device 46 stores the data of calculation result from the calculation storage device 29. As in the emission amount calculation unit 27, providing a clock function to the emission amount calculation apparatus 114 enables to set up the date of receiving the transportation.

A procedure for calculating the emission amount of the environment influence substance in the transportation process of the fuel will be described. The fuel transporting tank 43 of the tank truck and the fuel supply hose connected with the fuel storage tank 22 are first connected to receive the fuel from the fuel storage tank 22. The emission amount calculation apparatus 113 prepares for the information communication through the input device to transmit the information (the calculation result) stored in the calculation result storage device 29 to the emission amount calculation apparatus 114. A cable is connected to the communication device in the case of wire communication, and a wireless communication is established in the case of wireless communication.

Once the fuel is transmitted to the fuel transporting tank 43, the flow rate measurement apparatus 44 starts measuring. The measured flow rate is transmitted from the flow rate measurement apparatus 44 to the emission amount calculation apparatus 114. The CPU 45 of the emission amount calculation apparatus 114 conducts the processes of the steps 37 to 42 shown FIG. 6. To be more specific, the CPU 45 calculates the amount of heat of the fuel to be transported using Equation 1, based on the flow rate R of the fuel to be transported to the fuel transporting tank 43. The CPU 45 calculates the emission amount of the environment influence substance and the emissions intensity of the emission amount of the environment influence substance about the fuel to be transported using Equations 2 and 3, based on the information transmitted from the calculation result storage device 29 and the amount of heat calculated by Equation 1. The obtained calculation results are stored in the calculation result storage device 46 in a tabular format as shown in FIG. 7.

The tank truck in which the fuel is loaded in the fuel transporting tank 43 thereof is transferred to the fuel supply facility 100. The fuel in the fuel transporting tank 43 is supplied into the fuel storage tank of the fuel supply facility 100. The information stored in the calculation storage device 46 is transmitted from the emission amount calculation apparatus 114 to the produced fuel information storage device 103 (or the emission amount evaluation device 106) during supplying the fuel into the fuel storage tank. The transmission of the information is conducted by a wired communication (or wireless communication). A cable is connected the emission amount calculation apparatus 114 to the produced fuel information storage device 103 (or the emission amount evaluation device 106). The information transmitted from the emission amount calculation apparatus 114 includes, for example, the emissions intensity of the emission amount and the emission amount of the environment influence substance calculated by the emission amount calculation unit 27 and the emissions intensity of the emission amount and the emission amount of the environment influence substance calculated by the emission amount calculation apparatus 114, and the like.

In the evaluation system (see FIG. 1) 112 for amount of emission gases through fuel supply chain in a fuel supply facility 100, the emission amount evaluation device 106 stores the information transmitted from the emission amount calculation apparatus 114 and stored in the produced fuel information storage device 103, in the storage device 107. The evaluation system 112 is conducted the process of the steps 3-7 shown in FIG. 2 on the fuel purchased by the fuel supply facility 100. Each process of the steps 3-5 and 7 in the present embodiment is conducted the same as each process of the steps 3-5 and 7 in the first embodiment. The process of the step 6 in the present embodiment is different from the process of the step 6 in the first embodiment.

In this step 6 of the present embodiment, the emission amount evaluation device 106 evaluates the first emission amount of the environment influence substance based on the calculated fuel stockpile and the emissions intensity of the emission amount calculated by the emission amount calculation unit 27, that is, the emissions intensity of the emission amount about the fuel production, the second emission amount of the environment influence substance based on the calculated fuel stockpile and the emissions intensity of the emission amount calculated by the emission amount calculation apparatus 114, that is, the emissions intensity of the emission amount about the fuel transported and the third emission amount of the environment influence substance, respectively. The emission amount evaluation device 106 also calculated the first total amount of the environment influence substance based on the first, second and third emission amount. The first total emission amount of the environment influence substance about the purchased fuel is stored in the storage device 107.

Figure 4:
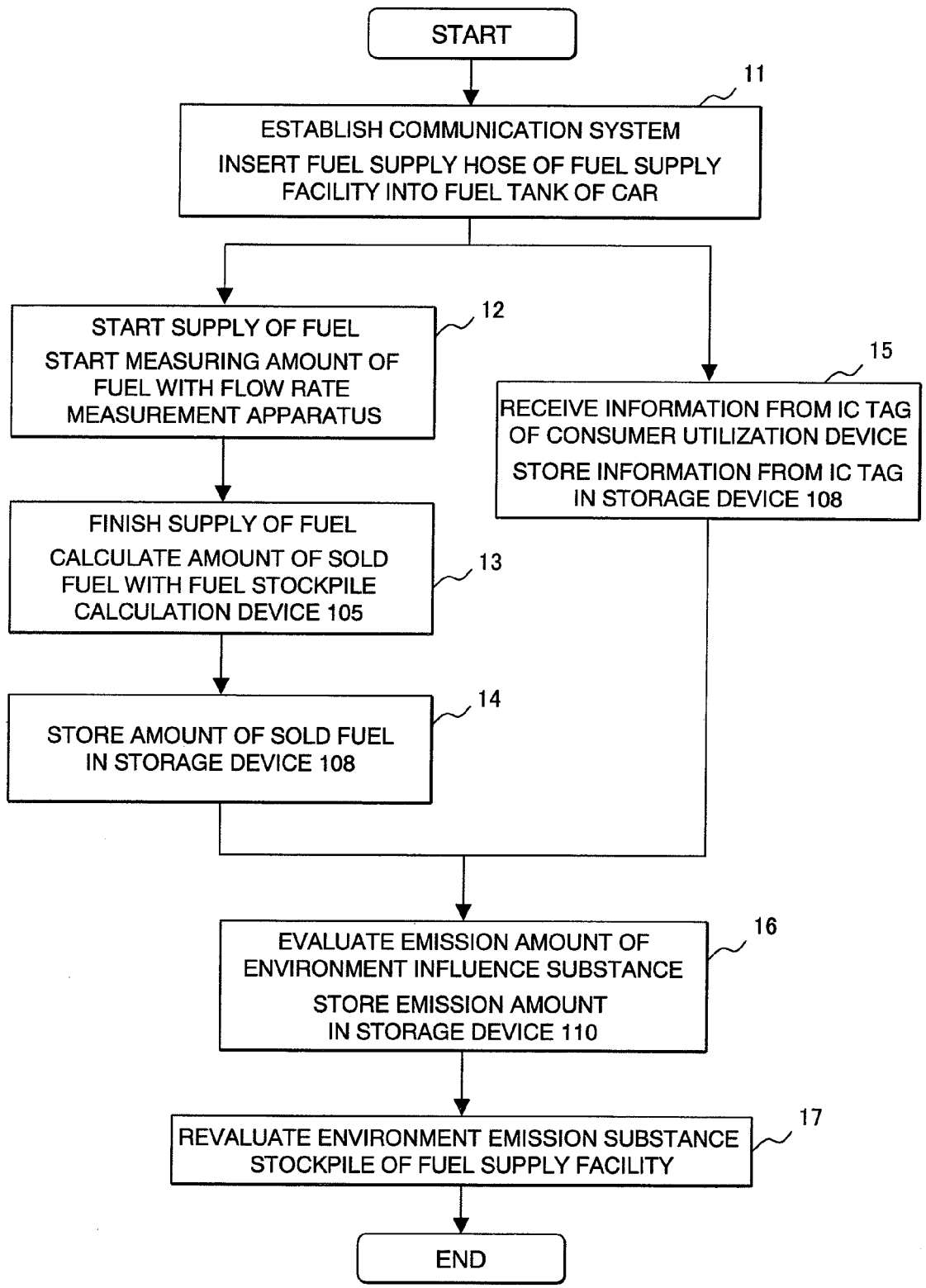
FIG. 4 is a basic structural diagram showing a calculation device for calculating amount of environment influencing substance emissions about fuel during fuel production.

In the present embodiment, the emission amount of the environment influence substance about the fuel sold to a consumer is also evaluated based on the processes the steps 13-17 disclosed in FIG. 4 by the evaluation system 112. The work and measurement of the steps 11 and 12 shown in FIG. 4 are performed. The fuel is supplied from the fuel storage tank in the fuel supply facility 100 to a fuel tank in a hydrogen car. In the present embodiment, each process of the steps 13-15 and 17 is conducted as with each process of the steps 13-15 and 17 in the first embodiment. The process of the step 16 in the present embodiment is different from the process of the step 16 in the first embodiment.

In this step 16 of the present embodiment, the emission amount evaluation device 111 evaluates the forth emission amount of the environment influence substance based on the sold amount of the fuel and the emissions intensity of the emission amount calculated by the emission amount calculation unit 27, the fifth emission amount of the environment influence substance based on the sold amount of the fuel and the emissions intensity of the emission amount calculated by the emission amount calculation apparatus 114 and the third emission amount of the environment influence substance, respectively. The emission amount evaluation device 111 also calculated the second total amount of the environment influence substance based on the forth, fifth and sixth emission amount. The second total emission amount of the environment influence substance about the sold fuel is stored in the storage device 108.

According to the present embodiment, the fuel with environmental properties as desired by the consumer can be supplied in the fuel supply facility. In the present embodiment, it is possible to evaluate the emission amount of the environment influence substance with pinpoint accuracy.

Third Embodiment

An evaluation system for amount of emission gases through fuel supply chain according to a third embodiment which is another embodiment of the present invention will be described below. The evaluation system of the present embodiment has the structure of the evaluation system disclosed in the second embodiment and evaluates emission amount of the environment influence substance when mixing the fuels for sale. The present embodiment is particularly effective for a secondary energy, such as hydrogen, that can be obtained by processing a primary energy. The present embodiment is also effective in the case of mixing hydrogen with methane for supply to the consumer. Usually, hydrogen is known as a clean energy that does not emit environment influence substances. However, hydrogen is a secondary energy that does not exist in nature, and consequently, emits environment influence substances such as carbon dioxide during the production process.

Figure 9:
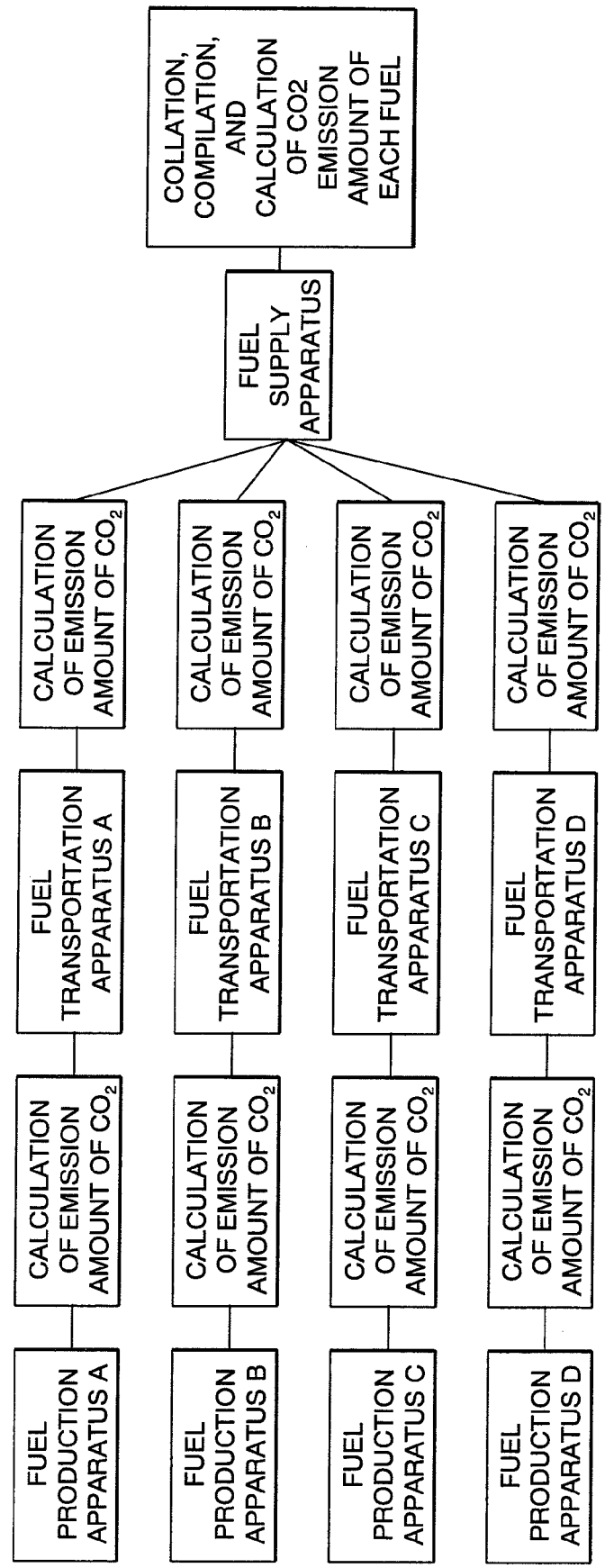
FIG. 9 is an explanatory drawing showing a model in which fuels having the same physical properties produced from a plurality of fuel production apparatus are stored in one fuel storage tank.

As shown in FIG. 9, in the evaluation system of the present embodiment, the amount of environment influence substance of the fuels are managed as follows when fuels that are produced by a plurality of fuel production apparatuses and that have the same physical properties but different environment influence substances and emission amount thereof are received by a single fuel supply facility 100 through a plurality of tank truck and stored in a single fuel storage tank of the fuel supply facility 100 for supply to the consumers. Each of the emission amount of the environment influence substance (for example, $CO_2$) about the fuel production apparatuses A-D shown in FIG. 9 is calculated by the emission amount calculation apparatus 113, namely, the emission amount calculation unit 27 shown in FIG. 5. Each of the emission amount of the environment influence substance (for example, $CO_2$) about the fuel being transported by the fuel transportation apparatuses (for example, the tank trucks) A-D shown in FIG. 9 is calculated by the emission amount calculation apparatus 114 shown in FIG. 8. Each of the calculation of the emission amount of the environment influence substances about a fuel supply apparatus (for example, the fuel supply facility 100) shown in FIG. 9 is performed by the evaluation system 112 shown in FIG. 1. Although the fuels have been managed by the fuel names in the first embodiment, in the present embodiment, the fuels are provided with ID numbers and managed as in FIG. 10. This enables to separately manage the same fuels. The ID is issued by transmitting and receiving data when the fuel is transferred from the fuel storage tank 22 to the fuel transporting tank 43 of the fuel transportation apparatus.

Figure 2:
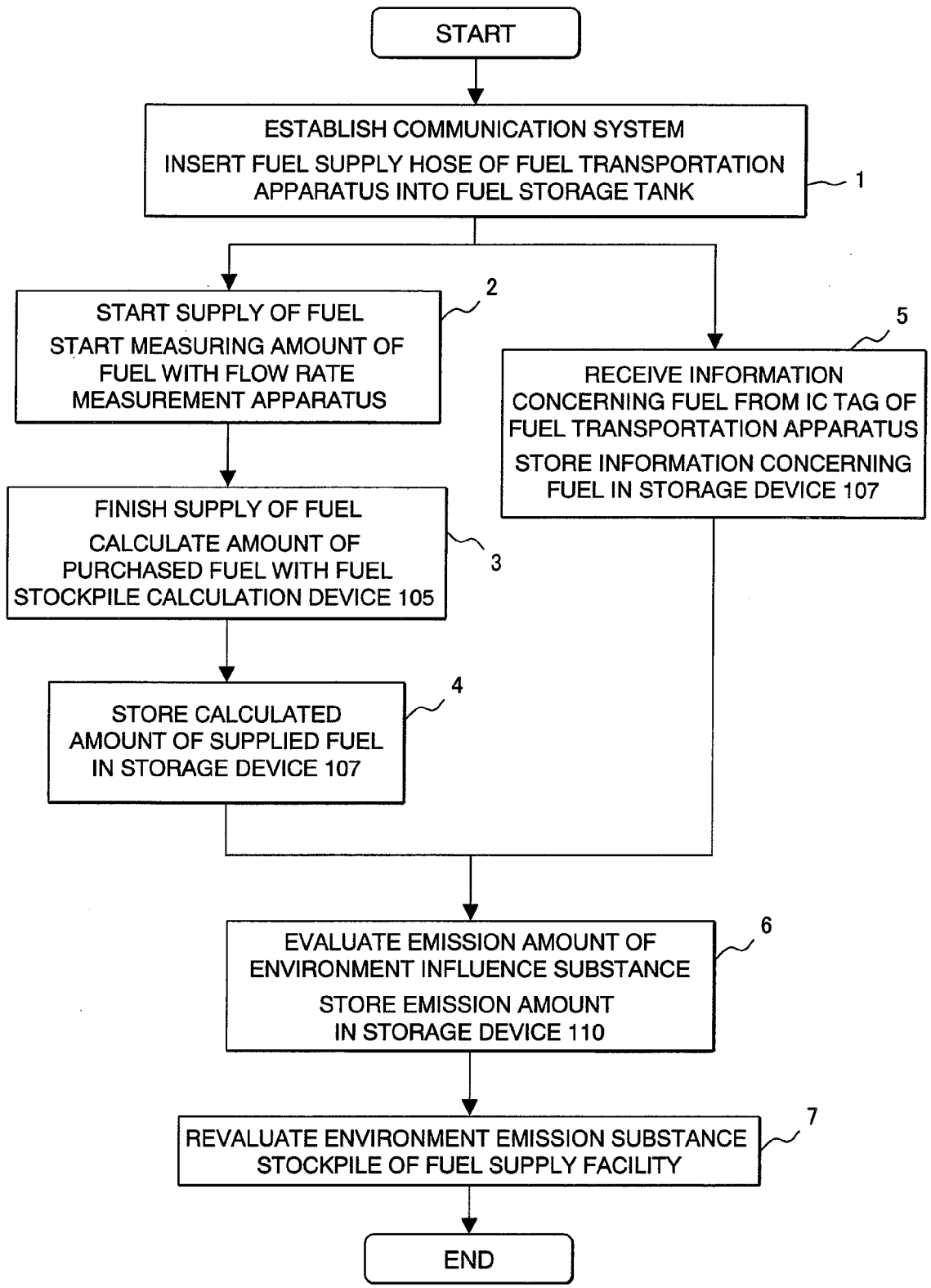
FIG. 2 is a flow chart showing a process in case of supplying fuel from a fuel production facility to a fuel supply facility through fuel transportation apparatus.

The process in the present embodiment of mixing a plurality of fuels when transferring the fuels from a plurality of fuel transportation apparatuses A-D to the fuel storage tank of the fuel supply facility 100 is also conducted in accordance with the flow chart in FIG. 2.

For each supplied fuel from the fuel transporting tank 43 of the tank truck into the fuel storage tank in the fuel supply facility 100, the amount of fuel is measured by the feed rate measurement apparatus 101 (step 2) and calculated by the fuel stockpile calculation device 105 (step 3). As soon as the supplying of the fuel is finished, the data of the purchased amount of fuel calculated by the fuel stockpile calculation device 105 is transmitted to the storage device 107 and stored therein (step 4). In this case, the data can be managed in accordance with the purpose of mixing by associating the purchased fuel ID with the current fuel ID as shown in FIG. 11. The process of the step 5 is conducted. The emission amount of the environment emission substance concerning the mixing fuel is calculated based on the first, second and third emission amount of each of fuels being mixed by the emission amount evaluation device 106 (step 6). The first, second and third emission amount are obtained as with the second embodiment. The first emission amount is also obtained as with the second embodiment. The environment emission substance stockpile evaluation device 109 reads data 0301 of emission amount of the environment influence substance about the fuel newly added from the storage device 107 and data of emission amount of the environment influence substance about the fuel already existing in the fuel supply facility 100 before the fuel is sold. The environment emission substance stockpile in the fuel supply facility 100, to which new fuel has been added, is reevaluated based on the data 0301 and the data of emission amount of the environment influence substance red from the storage device 110 by the environment emission substance stockpile evaluation device 109 (step 7). The reevaluated environment emission substance stockpile is stored in the storage device 110. As for the method of registering to the storage device 110, the history can be managed by adding the purchased fuel ID, the purchased date of the fuel, and the like, in addition to the data of the emission amount of the environment influence emission substance concerning the targeted fuel. The cost change evaluation, the cost minimization, and the like in accordance with the mixture ratio can be analyzed by evaluating the cost and the emission amount of the environmental emission substance of each fuel.

In the present embodiment, the emission amount of the environment influence substance about the fuel sold to a consumer is also evaluated based on the processes the steps 13-17 disclosed in FIG. 4 by the evaluation system 112. The work and measurement of the steps 11 and 12 shown in FIG. 4 are performed as with the second embodiment. In the present embodiment, the evaluation system 112 is conducted each process of the steps 13-17 as with the second embodiment.

According to the present embodiment, the environmental properties of the fuel can be clearly informed to the consumers even if an inexpensive fuel with low environmental properties and an expensive fuel with high environmental properties are mixed for sale.

When collectively storing a plurality of fuels with different environment influence substances and emission amount thereof as in the present embodiment, it is effective in miniaturizing the fuel supply facility but unsuitable in that the fuels with a plurality of environmental properties are retained. In some cases, responding to the environmental properties of fuel desired by the fuel consumer may not be possible with the fuels possessed by the fuel supply facility. In that case, the difference between the emission amount of the environment influence substance emissions of the fuel desired by the fuel consumer and the emission amount of the environment influence substance of the fuel actually supplied is calculated. The data of the difference with the emission amount of the environment influence substance is preferably managed in the environment emission substance stockpile storage device 110 of the fuel supply facility together with the purchased fuel ID, the purchased date of the fuel, and the like. Evaluating the difference and managing the history in this way enables to supply fuel in consideration of the difference at the next fuel supply and to provide services utilizing a point system, for example.

Fourth Embodiment

An evaluation system for amount of emission gases through fuel supply chain according to a forth embodiment which is another embodiment of the present invention will be described below. In the present embodiment, the emission amount of the environment influence substance concerning the fuel being supplied to a consumer is evaluated by a method different from the first example when selling the fuel to the consumer using the evaluation system 112 of the first embodiment. The present embodiment will now be described.

In the first embodiment, a method of supplying fuel based on the information set up by the consumer has been described. In the present embodiment, a method is described in which the fuel supply facility sets up a plurality of arbitrary environmental properties to the fuel, the arbitrarily set up emission amount of the environment influence substance of fuel is displayed on the dispenser, and the consumer goes to the dispenser with desired environmental properties to purchase the fuel.

In the present embodiment, a fuel supplier (for example, employee) in the fuel supply facility 100 sets up the environmental properties of fuel with the input device described in the first embodiment for acquiring, transmitting, and receiving information relating to the fuel. An example of the method for setting up with the input device includes data input with a keyboard, but the present invention is not limited to this, and includes, for example, pen input device, an input recognition system, and a voice recognition device.

The environmental properties input from the input device is stored in the storage device 108. A display apparatus for displaying the environmental properties is installed on the dispenser arranged in the fuel supply facility 110. The display apparatus displays the emission amount of the environment influence substance of fuel set up by the fuel supplier from the storage device 108 related to sold fuel or the cleanliness of fuel assumed from the emission amount of the environment influence substance. The consumer selects the fuel by selecting the dispenser corresponding to the cleanliness desired by the consumer.

For a specific description, it is assumed that the fuel to be supplied is high pressure hydrogen, and the fuel utilization device is a hydrogen car. The present embodiment conducts the process described in FIG. 4, too.

Hydrogen is supplied from the dispenser to the fuel tank of the hydrogen car, and the amount of supplied hydrogen is measured by the feed rate measurement apparatus 102 (step 12). The amount of the sold fuel is calculated by the fuel stockpile evaluation device 105 based on the measured amount of the sold fuel (step 13). As soon as the fuel supplying is finished, the data of the amount of the sold fuel calculated by the fuel stockpile evaluation device 105 is transmitted to the storage device 108 (step 14). At the same time, in the emission amount evaluation device 106, the emission amount of the environment influence substance related to sold fuel is evaluated based on the amount of sold fuel and the data (for example, the emissions intensity) of the emission amount of the environment influence substance of the fuel selected by the consumer (step 16) as with the first embodiment. The evaluated emission amount of the environment influence substance is stored in the storage device 108.

The environment emission substance stockpile evaluation device 109 reads the data of the emission amount (see FIG. 10) of the fuel environment influence substance on the sold fuel from the storage device 108 and the data of the emission amount of the environment influence substance on the fuel already existing in the fuel supply facility 100 before the fuel is sold. The environment emission substance stockpile remaining in the fuel supply facility after the fuel is sold is reevaluated based on the data of the emission amount of the fuel environment influence substance on the sold fuel and the data of the emission amount of the environment influence substance on the fuel already existing in the fuel supply facility 100 before the fuel is sold (step 17). The reevaluated environment emission substance stockpile is stored in the storage device 110. As for the method of registering to the storage device 110, the history can be managed by adding the purchased fuel ID, the purchased date of the fuel, and the like, in addition to the data of the emission amount of the environment influence emission substance concerning the targeted fuel. In the present embodiment, when the fuel supply facility 100 purchases the fuel from the fuel production facility, the work and measurement of the steps 1 and 2 shown in FIG. 2 is also performed in the fuel supply facility 100, and each process of the steps 3-7 shown in FIG. 2 is also conducted by the evaluation system 112.

In addition to the above embodiment, the following evaluation system can be realized by applying these embodiments.

A new evaluation system can be obtained by providing the fuel utilization device with an IC card and the like capable of recognizing individuals of the consumers and the fuel utilization devices of the consumers and providing the fuel supply facility with a communications device for communicating with the IC card, and a storage device including a database storing individual number of the IC card, name of consumers, and data of fuel specified by the consumers. The new evaluation system has a new emission amount evaluation device which evaluates the emission amount of the environment influence substance related to the sold fuel set up by the fuel supplier based on the environmental properties data, which is red from the database based on individual information of the consumer input through the communications device from the IC card, of fuel desired by the consumer and the above storage device which stores the type of fuel purchased by each consumer, amount of purchased fuel, the emission amount of the environment influence substance related to the sold fuel, and the like.

The emission amount of the environment influence substance can be more precisely evaluated by quantifying the emission amount of the environment influence substance in consideration of the amount of indirect energy such as the amount of energy of electric power, gas, and the like consumed when operating the fuel production apparatus 21 that conducts a process in the production process and the amount of fuel of gasoline and the like used to operate a transport car in the transportation process, when quantifying the emission amount of the environment influence substance or the emissions intensity of the emission amount of the environment influence substance.

Another evaluation system attaches fuel recognition information such as an ID number to the produced fuel to check the leakage and illegal activity while transporting the fuel with the transportation apparatus, transmits the information such as the amount of transportation of the fuel in the production process, the emission amount of the environment influence substance equivalent to the amount of the transportation and the like from the fuel production facility to the fuel supply facility, checks the fuel carried from the fuel production facility to the fuel supply facility by the transmission apparatus against the fuel information of the fuel supply facility by the transmission apparatus, and calculates difference between the amount of transportation and the amount of acquiring and the emission amount of the environment influence substance equivalent to the difference.

A fuel purchasing system, which is another embodiment, is installed in the fuel supply facility. This fuel purchasing system being used in the purchase of the fuel receives information relating to names of fuel production companies, names of fuel, emission amount of the environment influence substance of the fuel, and fuel costs transmitted from one or more fuel production companies, provides a function of storing and displaying the names of production companies and the transmitted information to the storage device 107 and displaying these information, selects the fuel desired by the fuel supply facility, and transmits the selection result to each fuel production companies. The fuel purchasing system can support the purchase of the fuel from the fuel production companies.

A system for supporting the supplier to purchase fuel can be established by providing a database including information of environmental tax, global warming coefficient, and the like in relation to the emission amount of the environment influence substance, and by setting up a certain objective function to minimize the environmental properties, costs, and the like.

An evaluation system can be established in which the name of the environment influence substance corresponding to the amount of hydrogen fuel sold to the consumer by the fuel supplier and the quantified emission amount are stored in a magnetic recording card, an IC card, or a memory mounted on the car.

A emission amount management system for the fuel environment influence substance can be established by providing a function for monitoring the amount of materials, information relating to the environmental loading material content, supplied amount of indirect energy, amount of fuel, and the like by a sensor, a database for storing the measurement values, a calculation function for calculating the emission amount of the environment influence substance of fuel based on the measurement values of the sensor red from the database, and another database for storing the calculation result, as a system for quantifying the emission amount of the environment influence substance of carbon dioxide and the like emitted from the fuel production facility and for managing the information.

When handling the fuel such as organic hydride as a system for quantifying the emission amount of the environment influence substance of carbon dioxide and the like emitted from the fuel production apparatus and for managing the information, the emission amount management system for the fuel environment influence substance possessed by the fuel supplier can be established into a system for storing the performance data such as efficiency of the fuel utilization device separately possessed by the consumer into a memory of the emission amount calculation unit 27 or into a database mounted on the fuel utilization device or part of the fuel storage tank or pipeline for supplying the fuel to the fuel utilization device, and for calculating the emission amount of the environment influence substance emitted by the consumer.

According to the embodiments described above, the environmental properties of the fuel being sold can be presented to the fuel consumer and the consumer can select the desired fuel by the evaluation and management of the environment emission substance stockpile accumulated during the production and transportation of fuel in relation to the fuel stored in the fuel supply facility. Therefore, the fuel consumer can select fuel based on his/her environmental awareness. The willingness of the fuel consumer to purchase the environmental fuel can be increased by evaluating the environmental contribution of the fuel consumer. Meanwhile, the fuel supplier will consider satisfying both the environmental awareness and the cost. As a result, the reduction in emission amount of the greenhouse gas can be achieved by raising the environmental awareness of the fuel supplier and the fuel consumer.

What is claimed is:

1. An evaluation system for amount of emission gases through fuel supply chain in a fuel supply facility for supplying stored fuel to a consumer, comprising:
 a first evaluation device for evaluating first amount of emission of environment influence substance about fuel supplied from a fuel production facility to said fuel supply facility;
 a first storage device for storing first amount of emission of environment influence substance about said fuel in a production stage evaluated by said first evaluation device;
 a second evaluation device for evaluating second amount of emission of environment influence substance equivalent to said fuel sold to a consumer;
 a second storage device for storing said second amount evaluated by said second evaluation device;
 a third evaluation device for evaluating third amount of emissions of said environment influence substance about said fuel stored in said fuel supply facility based on said first amount in the first storage device and said second amount in said second storage device; and
 a third storage device for storing said third amount evaluated by said third evaluation device,
 wherein said first evaluation devices quantifies said first amount by using at least an amount of materials of said fuel, an amount of generated heat of said materials, emissions intensity of $CO_2$ emission amount of said materials, an amount of generated heat of said fuel, an amount of said fuel, and emissions intensity of $CO_2$ emission amount of said fuel as input data, and
 said second evaluation devices quantifies said second amount by using at least an amount of said materials of said fuel, an amount of generated heat of said materials, emissions intensity of $CO_2$ emission amount of said materials, an amount of generated heat of said fuel, an amount of said fuel, and emissions intensity of $CO_2$ emission amount of said fuel as input data.

2. The evaluation system for amount of emission gases through fuel supply chain according to claim 1, wherein said first evaluation device evaluates said first amount based on amount of said fuel, which is supplied to a first tank in said fuel supply facility, measured by a first feed rate measurement apparatus and first emissions intensity of emission amount of said environment influence substance, which is emitted during fuel production, evaluated by a first calculation apparatus disposed in said fuel production facility and entered from said first calculation apparatus.

3. The evaluation system for amount of emission gases through fuel supply chain according to claim 1, wherein said first evaluation device evaluates said first amount based on said amount of said fuel and second emissions intensity of emission amount of said environment influence substance about said fuel, which is transported by a fuel transportation apparatus, evaluated by a second calculation apparatus installed on said fuel transportation apparatus and entered from said second calculation apparatus.

4. The evaluation system for amount of emission gases through fuel supply chain according to claim 3, further comprising
   a communication device for transmitting and receiving data stored in storage device of at least one of said fuel transportation apparatus and said fuel supply facility.

5. The evaluation system for amount of emission gases through fuel supply chain according to claim 1, wherein said second evaluation device evaluates said second amount concerning said fuel being sold to said consumer by using a environmental property to said fuel for sale displayed in a display on one fuel supply apparatus, which is selected by said consumer in order to purchase fuel, of a plurality of fuel supply apparatuses disposed in said fuel supply facility, and said second storage device stores information regarding a type of sold fuel, an amount of sold fuel, and said second amount related to said sold fuel of each consumer.

6. The evaluation system for amount of emission gases through fuel supply chain according to claim 1, further comprising:
   communication device for transmitting environmental properties data of said fuel designated by said consumer from a memory device of said consumer to second evaluation device,
   wherein said second evaluation device evaluates said second amount concerning said fuel desired by said consumer based on said environmental properties data entered, and
   said second storage device stores information regarding a type of sold fuel, an amount of sold fuel, and said second amount related to said sold fuel of each consumer.

7. The evaluation system for amount of emission gases through fuel supply chain according to claim 1, further comprising:
   display apparatus for displaying information stored in at least one of said second storage device and said third storage device.

8. The evaluation system for amount of emission gases through fuel supply chain according to claim 7,
   wherein said display apparatus displays a name of fuel, a name of said environment influence substance emitted before the fuel supply, and amount of emission of said environment influence substance equivalent to the amount of supplied fuel.

9. The evaluation system for amount of emission gases through fuel supply chain according to claim 1, wherein said fuel is hydrogen.

* * * * *